J. L. WOODBRIDGE.
ELECTRICAL SYSTEM OF DISTRIBUTION.
APPLICATION FILED JUNE 9, 1914.
1,256,628.
Patented Feb. 19, 1918.
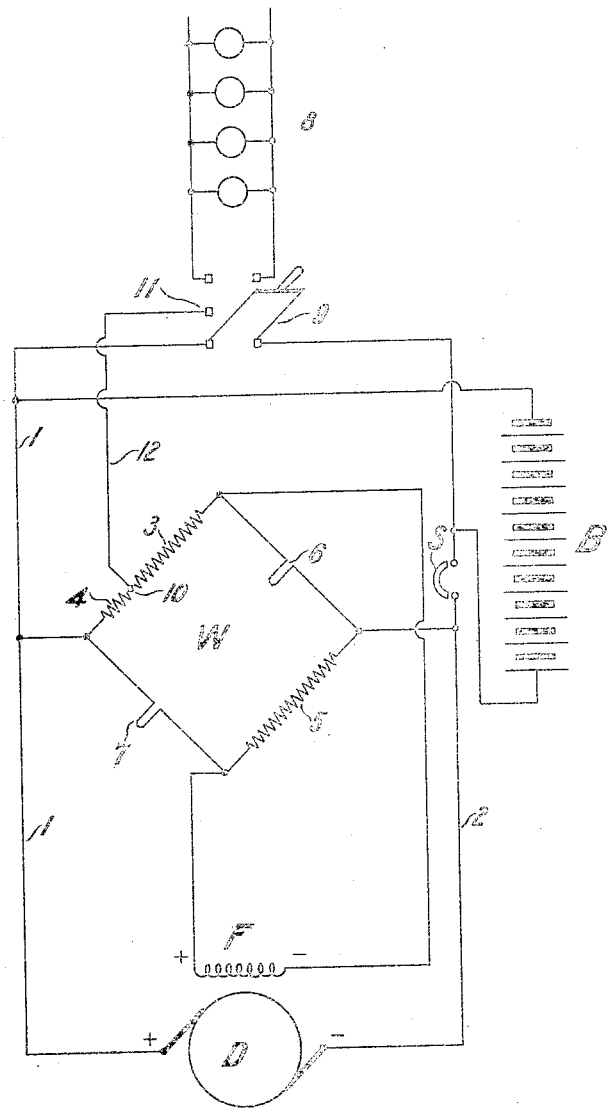
WITNESSES:
INVENTOR
Joseph Lester Woodbridge
BY
Augustus B Stoughton
ATTORNEY.

UNITED STATES PATENT OFFICE.

JOSEPH LESTER WOODBRIDGE, OF PHILADELPHIA, PENNSYLVANIA.

ELECTRICAL SYSTEM OF DISTRIBUTION.

1,256,628.  Specification of Letters Patent.  Patented Feb. 19, 1918.

Application filed June 9, 1914. Serial No. 844,035.

*To all whom it may concern:*

Be it known that I, JOSEPH LESTER WOODBRIDGE, a citizen of the United States, and a resident of Philadelphia, in the county of Philadelphia and State of Pennsylvania, have invented certain new and useful Improvements in Electrical Systems of Distribution, of which the following is a specification.

My invention relates to systems in which a variable speed dynamo supplies current to a consumption circuit requiring substantially constant voltage, and in which a storage battery is employed for supplying current to the circuit when the dynamo is shut down. My invention relates particularly to systems in which apparatus is provided for controlling the field excitation of the dynamo to produce constant voltage with variable speed. In such systems it is customary to adjust the normal dynamo voltage at a value slightly above the floating voltage of the battery but not sufficiently high to give the battery a high voltage gassing charge.

The object of my invention is to provide means in such a system for giving the battery a high voltage gassing charge at a time when the consumption circuit is disconnected and for automatically reducing the voltage to normal whenever the consumption circuit is connected to the dynamo and battery.

The accompanying drawing is a diagrammatic illustration of one embodiment of my invention.

In the drawing, D is the dynamo and F its field winding. The dynamo is connected to the circuit 1—2 across which a storage battery B is also connected. An automatic switch S is shown designed to connect the dynamo to the circuit when its voltage is suitable and to disconnect the dynamo when its voltage is below normal. This switch may be of any of the well known types. Across the conductors 1—2 is connected a Wheatstone bridge W comprising resistances 3, 4 and 5 connected as shown in two opposite branches, these resistances having a zero temperature coefficient, and two resistances 6—7 in the other two opposite branches, these resistances having a high positive temperature coefficient, such as the well known iron wire "ballasts." The field F is connected across the two opposite points of the Wheatstone bridge as shown. The consumption circuit is shown at 8 and this circuit may be connected to the circuit 1—2 by means of the switch 9. The two resistances 3 and 4 in one branch of the Wheatstone bridge are connected in series and a conductor 12 connects the junction point 10 between these two resistances with an extra contact clip 11 on the switch 9, so arranged that when the switch is closed the resistance 4 is short circuited by conductors 1 and 12 and the corresponding blade of the switch. The design of the apparatus is such that when the resistance 4 is thus short circuited by closing the switch 9 the voltage of the dynamo is maintained at the normal value slightly above the floating voltage of the battery for all dynamo speeds above a certain critical speed. This result is accomplished by reason of the special characteristics of the resistances comprising the bridge. The iron wire ballasts 6 and 7 exhibit a constant current characteristic for wide variations of impressed voltage within certain limits and the resistances 3 and 5 are so designed that when they are carrying a current equal to the constant current maintained by the resistances 6 and 7 the voltage drop across 3 or 5, respectively, will be one-half the desired limiting voltage across the conductors 1—2. Should the voltage across conductors 1 and 2 reach this desired limit the potential across the field F would be reduced to zero. For all values of voltage across the circuit 1—2 below this limit there will be a flow of current in the field F tending to increase with a slight reduction of voltage across the conductors 1—2, thus maintaining the voltage of the dynamo D substantially constant.

When the switch 9 is opened the short circuit around resistance 4 is removed and there will be an additional drop in that branch of the Wheatstone bridge. This will lower the potential at the negative terminal of the field F, causing additional current to flow through the field and raising the voltage of the dynamo D. Thus when the switch 9 is opened the voltage of the dynamo may be raised to give the battery a high voltage gassing charge, but whenever the consumption circuit 8 is connected by closing the switch 9 the voltage of the dynamo will be automatically reduced to normal by short-circuiting the resistance 4, thereby avoiding an abnormally high voltage on the consumption circuit.

I do not desire to limit my invention to the particular embodiment shown and described, nor to the particular means for controlling the dynamo voltage used as an illustration. Obviously modifications may be made in the apparatus shown without departing from the spirit of the invention.

Having described my invention what I claim and desire to secure by Letters Patent is—

In combination, a dynamo and its field winding, a storage battery connected to the dynamo, a Wheatstone bridge comprising resistors of different temperature co-efficients connected to the dynamo and to the field winding and adapted to control the current in said winding to maintain substantially constant dynamo voltage, an auxiliary resistor connected in series with one of the resistors of the Wheatstone bridge and adapted when in circuit to increase the voltage normally maintained, a consumption circuit, a switch for connecting the consumption circuit to the dynamo and battery, and means controlled by said switch for short-circuiting said auxiliary resistor upon the closing of the switch.

In testimony whereof I have hereunto signed my name.

JOSEPH LESTER WOODBRIDGE.

Witnesses:
J. H. TRACY,
F. G. BEETEM.

Copies of this patent may be obtained for five cents each, by addressing the "Commissioner of Patents, Washington, D. C."